(12) United States Patent
Greenleaf

(10) Patent No.: US 11,897,018 B1
(45) Date of Patent: Feb. 13, 2024

(54) FLEXGRIP CAM-WING ARRANGEMENT

(71) Applicant: Richard J. Greenleaf, Manchester, MA (US)

(72) Inventor: Richard J. Greenleaf, Manchester, MA (US)

( * ) Notice: Subject to any disclaimer, the term of this patent is extended or adjusted under 35 U.S.C. 154(b) by 0 days.

(21) Appl. No.: 18/445,012

(22) Filed: Mar. 1, 2023

(51) Int. Cl.
  *B21D 37/06* (2006.01)
  *B25J 15/12* (2006.01)

(52) U.S. Cl.
  CPC ............... *B21D 37/06* (2013.01); *B25J 15/12* (2013.01)

(58) Field of Classification Search
  CPC .............. F16B 5/0024; F16B 5/0028; Y10T 403/5761; Y10T 83/9428; Y10T 83/9473; Y10T 83/9423; Y10T 83/9425; B21D 37/04; B21D 37/06; B21D 28/34; B21D 38/34; F16D 1/0852; F16D 1/087; B26F 1/14
  See application file for complete search history.

(56) References Cited

U.S. PATENT DOCUMENTS

| | | | | |
|---|---|---|---|---|
| 240,232 | A * | 4/1881 | Church | F16B 5/0028 403/309 |
| 288,746 | A * | 11/1883 | Wielhaber | F16G 11/04 403/314 |
| 4,620,814 | A * | 11/1986 | May | F16H 57/0025 403/372 |
| 6,893,185 | B1 * | 5/2005 | Wood | F16B 2/065 403/374.1 |
| 7,478,970 | B2 * | 1/2009 | Wimberley | F16D 1/0858 403/374.2 |

* cited by examiner

*Primary Examiner* — Jennifer S Matthews
(74) *Attorney, Agent, or Firm* — Don Halgren

(57) ABSTRACT

A tool gripper assembly arrangement for holding a tool accurately in a holder plate. An elongated gripper bore opening is arranged within the holder plate, for receipt of an elongated tool within that gripper bore opening. A pair of thin, flexible, curvilinear gripper wings arranged between the wedge receiving channel and the gripper bore opening. An elongated gripper-wing pressing-wedge arranged within the elongated gripper wedge receiving channel; and a wedge and wedge-channel-engaging adjustment bolt is arranged between adjacent surfaces of the wedge and the wedge receiving channel arranged to bias both the wedge and the pair of gripper wings radially inwardly toward a longitudinal axis of the gripper bore opening, so as to form a perfect tool gripping-circle around and move the tool held within the elongated gripper bore.

4 Claims, 9 Drawing Sheets

FLEXGRIP CAM-WING ARRANGEMENT

FIELD OF THE INVENTION

The present invention relates to securement and alignment arrangements for holding tools in rigid plates in secure and very accurate alignment, and for also for holding those plates together in secure and accurate alignment, such as for example holding plates together securely and accurately in a compound tooling punch press machine assembly, and is based upon provisional application No. 63/474,492, filed on 20 Aug. 2022, and incorporated by reference, and also application Ser. No. 16/873,258, now U.S. Pat. No. 10,889,020, issued 12 Jan. 2021, and application Ser. No. 15/731,317, now U.S. Pat. No. 10,384,257, issued 20 Aug. 2019, both incorporated herein by reference, and both directed to more specifically to gripping plates for securely holding and aligning die members within that gripping plate, and are a continuation-in-part application of application Ser. No. 16/602,167, which is a continuation-in-part application of application Ser. No. 16/501,026, filed Feb. 11, 2019 which is a continuation-in-part application of application Ser. No. 15/530,236, filed Dec. 14, 2016, now U.S. Pat. No. 10,201,906, each of which are incorporated herein by reference.

PRIOR ART DISCUSSION

Compound tooling is currently utilized by hundreds of manufacturers to produce thousands of different types of washers made from aluminum, brass, copper, nylon, steel utilized in almost everything society touches. Washers are for example, utilized in any product with nuts and bolts or moving parts. The inside diameter and the outside diameter of these washers or other punched parts have become more critical and significant for use in the manufacture of high-quality precision devices. Advances are cited and discussed in the above-identified patent filings and are included herewith.

Prior art tool and die sets have to be made slightly loose, and those tools use clamping screws which thus influences a die in a tool holder. That in turn establishes inaccuracies and a loss of concentricity of the alignment of those tools. Recent advances have been improved upon by the present invention which allows adjustment and assembly of multiple gripping arrangements in a single gripping or die holder plate. However, holding of a die holder plate to an ID punch holder plate in the prior art requires multiple screw thread members together with multiple dowels to align and assemble these pieces in an extensive and inefficient manner.

It is thus an object of the present invention to overcome the disadvantages of the prior art, and improve upon my earlier invention shown in U.S. Pat. No. 10,889,020, by providing instead, a radially inwardly directed force via an intermediate wedge biasing against tool, radially inwardly pressing against wing-like members (34) in the present invention, and avoiding possible alignment damaging circumferential movement produced by the flexible gripper claws (52), shown in FIG. 3 of the '020 patent, when the adjustment bolt (70) is tightened.

It is a further object of the present invention to provide an assembly member in which a first plate, or for example, an ID punch holder plate for a punch press and a second plate, or for example, a compound punch holder plate for a punch press, are assembled in simplified, quickly secured alignment with one another.

BRIEF SUMMARY OF THE INVENTION

The present invention comprises a tool gripper assembly securement arrangement for quickly and easily holding securely and accurately a tool, for example, a punch or a die in a tool holding plate in, for example, a punch press assembly, and to facilitate joining in proper alignment two of those plate members, for example, as those required in a punch press machine, as shown in the above identified, incorporated '906 and '020 patents. Such a machine of necessity needs a quick tool change arrangement. A reciprocally movable upper support member is arranged on a punch press frame. The system also includes a lower support member arranged on the punch press frame. A pair of tool gripping members are arranged on the upper support member and a pair of tool gripping members are also arranged on the lower support member.

For our purposes here, only the tool gripping members for the lower support member will be discussed. The tool gripping members in this instance are a die holder plate and a punch holder plate, both being critically required to be in proper alignment with one another for the parts-punching operation to properly proceed. The die holder plate and the punch holder plate are preferably identical to one another wherein one central tool gripper opening in one plate holds a die and one central opening in the other plate holds a punch.

The plates in this particular assembly are of rectilinear configuration having one or more central openings for the punch press operation to take place. The first plate is an upper or die holder plate to be secured together in close alignment with a lower or second immediately adjacent punch holder plate. The first or upper plate preferably has a plurality of tapered (connectivity) openings and the second or lower plate has a corresponding plurality of (connectivity) bores, a lower portion of which are threaded. Otherwise, these matable plates are identical to one another excepting for their connectivity openings.

The respective (connectivity) openings in the upper or die holder plate and the lower or punch holder plate comprising the joined assembly have correspondingly tapered and may have threaded holes respectively so as to permit a snug screwed-in wedging arrangement between the elongated securement member and their respective plates which are secured thereby, as specified in my earlier patents referenced hereinabove.

The holder plates of the present invention may have one or more first embodiment tool gripper opening arrangements distributed across its surface, as for example, shown in FIG. 2 in U.S. Pat. No. 10,889,020. The attached holder plates also require their tool gripper opening arrangements to be in extremely close longitudinal alignment with one another when those holder plates are attached to one another. The first embodiment in the present invention's tool gripper embodiment, best shown in FIG. 1, is for a central (non-plate-edge) location, and the second embodiment of the present invention's tool gripper embodiment, is best shown in FIGS. 9 and 12, is to be utilized for near-plate-edge locations.

Each first embodiment (first) tool gripper opening arrangement, FIG. 1, comprises a tool gripper opening in the holder plate, a portion of an adjustable bolt bore in that plate, a truncated wedge receiving channel, having a longitudinal axis which is parallel to the longitudinal axis of the tool gripper opening; and an elongated truncated wedge, for receipt within the truncated wedge receiving channel, best shown in FIGS. 1 and 12.

The tool gripper opening is comprised of a semicircular tool engaging periphery and a generally semicircular flexible wing-tool-engaging portion. The generally semicircular flexible wing tool engaging portion comprises a pair of plate contiguous, thin flexible gripper wings each comprising 90 degrees of the (closed) tool gripper opening, and each gripper wing having a gripper wing flex-point diagonally opposed to one another across the midpoint of the tool gripper opening. The thin flexible gripper wings best shown in FIGS. 1 and 10, each have an elongated distalmost edge which is preferably parallel to the longitudinal axis of the gripper opening bore. The elongated distalmost edges of the flexible gripper wings are spaced apart from one another in their pre-biased configuration, as shown in FIG. 1.

The truncated wedge receiving channel is arranged to supportively enclose an elongated truncated wedge having a curvilinear flexible gripper wing biasing surface and two nonparallel side surfaces which engage the truncated wedge receiving channel. The elongated truncated wedge has a truncated side which engages the inner side of the truncated wedge receiving channel.

An adjustment bolt bore is arranged longitudinally half within the receiving channel within the holder plate, and longitudinally half within the elongated truncated wedge, the adjustment bolt bore being parallel to the longitudinal axis of the gripper opening in the holder plate and parallel to the longitudinal axis of the elongated truncated wedge. The adjustment bolt bore has a tapered $1^{st}$ end, and a tapered $2^{nd}$ end.

The adjustment bolt, has a first or head end of tapered configuration, and a nut arranged on its second or distal end, the nut being of tapered configuration, with the tapers arranged to slidably engage the respective tapers on the adjustment bolt bore.

When a tool is arranged within the gripper opening bore, the flexible gripper wings are slightly spaced apart from a tool placed thereadjacent. A wedge biasing adjustment bolt within the adjustment bolt bore may be rotatively tightened so as to bring the head end and the nut thereof closer together to biasedly the engage the intermediately placed wedge between the adjustment bolt and the flexible gripper wings. Adjustment of the adjustment bolt within the adjustment bolt bore effects the tightening of the flexible gripper wings against the semicircular portion of the elongated tool held within the tool gripper opening thereadjacent, thus formed into a perfect circle around that tool being held within the gripper opening bore.

The second embodiment tool gripper opening arrangement, best seen in FIGS. 9, 10, and 11, comprises a tool gripper opening in the holder plate, close to one side edge of that holder plate. A truncated wedge receiving channel, has a longitudinal axis which is parallel to the longitudinal axis of the tool gripper opening; and an elongated truncated wedge, as shown in FIG. 11, for receipt within the truncated wedge receiving channel.

The second embodiment of the tool gripper opening is thus comprised of a semicircular tool engaging periphery and a generally semicircular flexible wing-tool-engaging portion. The generally semicircular flexible wing tool engaging portion comprises a pair of thin flexible gripper wings each having a gripper wing flex-point diagonally opposed to one another across the midpoint of the tool gripper opening. The thin flexible gripper wings each have an elongated distalmost edge which is parallel to the longitudinal axis of the gripper opening bore. The elongated distalmost edges of the flexible gripper wings are spaced apart from one another in their pre-biased configuration.

The truncated wedge receiving channel is arranged to supportively enclose an elongated truncated wedge having a curvilinear flexible gripper wing biasing surface and two nonparallel side surfaces which engage the truncated wedge receiving channel. The elongated truncated wedge has a truncated side which engages the inner side of the truncated wedge receiving channel, and becomes slightly spaced apart therefrom as the adjustable bolt is tightened.

A second embodiment adjustment bolt, represented in FIG. 11, is arranged through a second embodiment adjustment bolt receiving bore extending into the side edge of the tool support plate in a manner which is perpendicular to the longitudinal axis of the gripper opening bore and the longitudinal axis of the elongated wedge. A shallow adjustment bolt receiving bore, as represented in FIG. 10, is arranged within and in longitudinal alignment with the second adjustment bolt receiving bore in the side edge tool grouping embodiment of the tool support plate. When a threaded second embodiment adjustment bolt is arranged within the second adjustment of the tool support plate, a biasing force is applied to the elongated wedge which is intermediately disposed between the adjustment bolt and the flexible wings pivotably wrapping around a semicircular portion of a tool within the adjustment bolt receiving bore.

Thus, with both the first and second embodiments of the tool gripper, an intermediate member, the elongated curvilinear wedge in each case, distributes a radially inwardly directed biasing force against both flexible wings evenly and without circumferential biasing thereof, as is the case with the prior art.

The invention thus comprises a tool gripper assembly arrangement for holding a tool accurately in a holder plate, comprising an elongated gripper bore opening arranged within the holder plate, for receipt of an elongated tool within that gripper bore opening, the elongated gripper bore having a longitudinal axis; a pair of thin, flexible, curvilinear gripper wings arranged between the wedge receiving channel and the gripper bore opening, the gripper wings having an inner surface defining a longitudinally divided half-portion of the gripper bore opening; an elongated wedge receiving channel arranged within the holder plate immediately adjacent the gripper bore opening; an elongated gripper-wing pressing-wedge arranged within the elongated gripper wedge receiving channel; and a wedge and wedge-channel-engaging adjustment bolt arranged between adjacent surfaces of the wedge and the wedge receiving channel arranged to bias both the wedge and the pair of gripper wings radially inwardly toward a longitudinal axis of the gripper bore opening, so as to form a perfect tool gripping-circle around and move the tool held within the elongated gripper bore. The elongated gripper bore opening and the elongated tool each have an independent longitudinal axis, which are radially displaceable with respect to one another. Each of the gripper wings has a proximal end which is unitary with the holder plate. Each of the gripper wings has a distal end which are spaced apart from one another in a pre-adjustment orientation. The adjustment bolt has a longitudinal axis which is parallel to the longitudinal axis of the elongated gripper bore. The distal end of each of the gripper wings are arranged to abut one another in a full inwardly biased orientation.

The invention also comprises a tool gripper assembly arrangement for holding a tool accurately in a holder plate, comprising: an elongated gripper bore opening arranged within the holder plate, for receipt of an elongated tool within that gripper bore opening, the elongated gripper bore having a longitudinal axis; a pair of thin, flexible, curvilinear gripper wings arranged between the wedge receiving channel and the gripper bore opening, the gripper wings having an inner surface defining a longitudinally divided half-portion of the gripper bore opening; an elongated wedge receiving channel arranged within the holder plate immediately adjacent the gripper bore opening; an elongated gripper-wing pressing-wedge arranged within the elongated gripper wedge receiving channel; a side-positioned adjustment bolt receiving bore arranged in a side edge of the holder plate; and an adjustment bolt arranged within the side positioned adjustment bolt enabled to bias both the wedge and the pair of gripper wings radially inwardly toward a longitudinal axis of the gripper bore opening, so as to form a perfect tool gripping-circle around and move the tool held within the elongated gripper bore. The elongated gripper wing pressing wedge has an adjustment bolt receiving-recess in longitudinal alignment with the side positioned adjustment bolt receiving bore to enable properly directed bias to the gripper wing pressing wedge by the adjustment bolt thereagainst. The adjustment bolt has a longitudinal axis which is perpendicular to the longitudinal axis of the gripper bore opening. The flexible curvilinear gripper wings pivot slightly about their proximal ends in opposite-handed directions when biased radially inwardly by the gripper wing pressing wedge, thereby avoiding any rotational bias against a tool within the elongated gripper bore opening, and avoid resistance to insertion of a tool therewithin.

The invention also comprises a method of securing a tool in a gripper bore opening in a holder plate, wherein the gripper bore opening comprises a first semicircular wall portion and a second semicircular arrangement of gripper wings pivotably displaceable from a slightly oval orientation to a perfect circle with respect to the first semicircular wall portion, comprising the steps of: biasing the gripper wings radially inwardly towards the gripper bore opening so as to displace a tool within the gripper bore opening into coaxial alignment with the perfect circle gripper bore opening. The gripper wings are biased radially inwardly by pressure from a curvilinear surface of a displaceable wedge. The radially inwardly directed pressure of the displaceable wedge is generated by the tightening of an adjustable bolt arranged between the displaceable wedge and a rigid wall surface of the holder plate. The gripper wings each have a distal edge which are spaced apart from one another in a pre-biasing configuration. The distal edge of each of the gripper wings abut one another after their radially inward displacement effected by the displaceable wedge.

BRIEF DESCRIPTION OF THE DRAWINGS

The objects and advantages of the present invention will become more apparent when viewed in conjunction with the following drawings, in which.

DETAILED DESCRIPTION OF THE PREFERRED EMBODIMENTS

Figure 1:
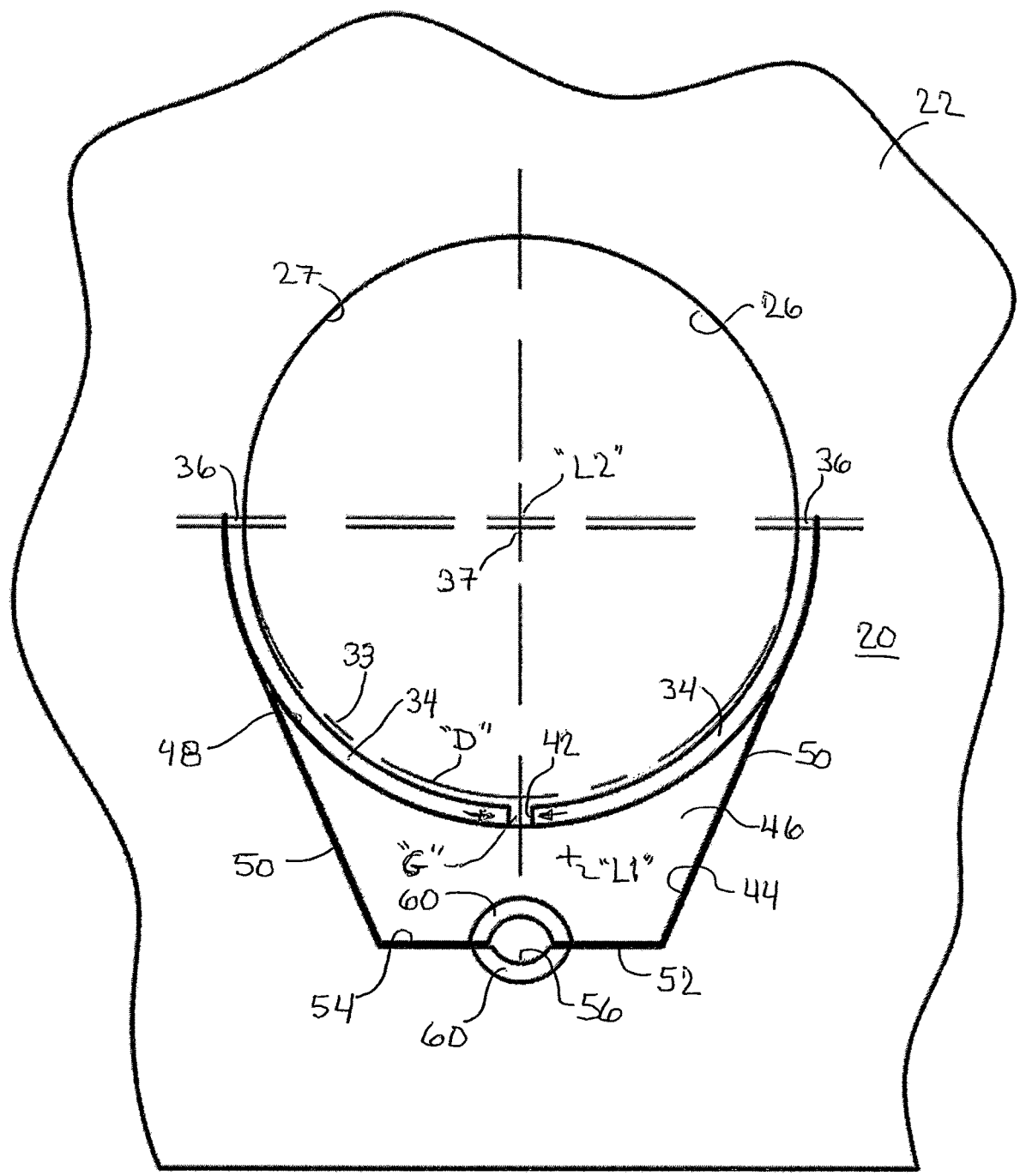
FIG. 1 is a plan view of a first gripping arrangement opening showing the respective gripper opening bore with both the separate tool and bore center longitudinal axes indicated, the adjustable bolt bore and its associated flexible gripper wings.

Referring now to the drawings in detail, and particularly to FIG. 1, there is shown a first preferred embodiment of the present invention which comprises a tool gripper securement arrangement 20, such as those required in a punch press machine, as shown in the above-identified '906 and '020 patents.

The tool gripping arrangement shown in this instance is a die holder plate 22. The die holder plate 22 (shown) and the punch holder plate, not shown, are preferably identical to one another wherein one central tool gripper opening bore 26 in one plate 22 typically holds a die tool "T" and one central opening in the other plate holds a punch.

Figure 2:
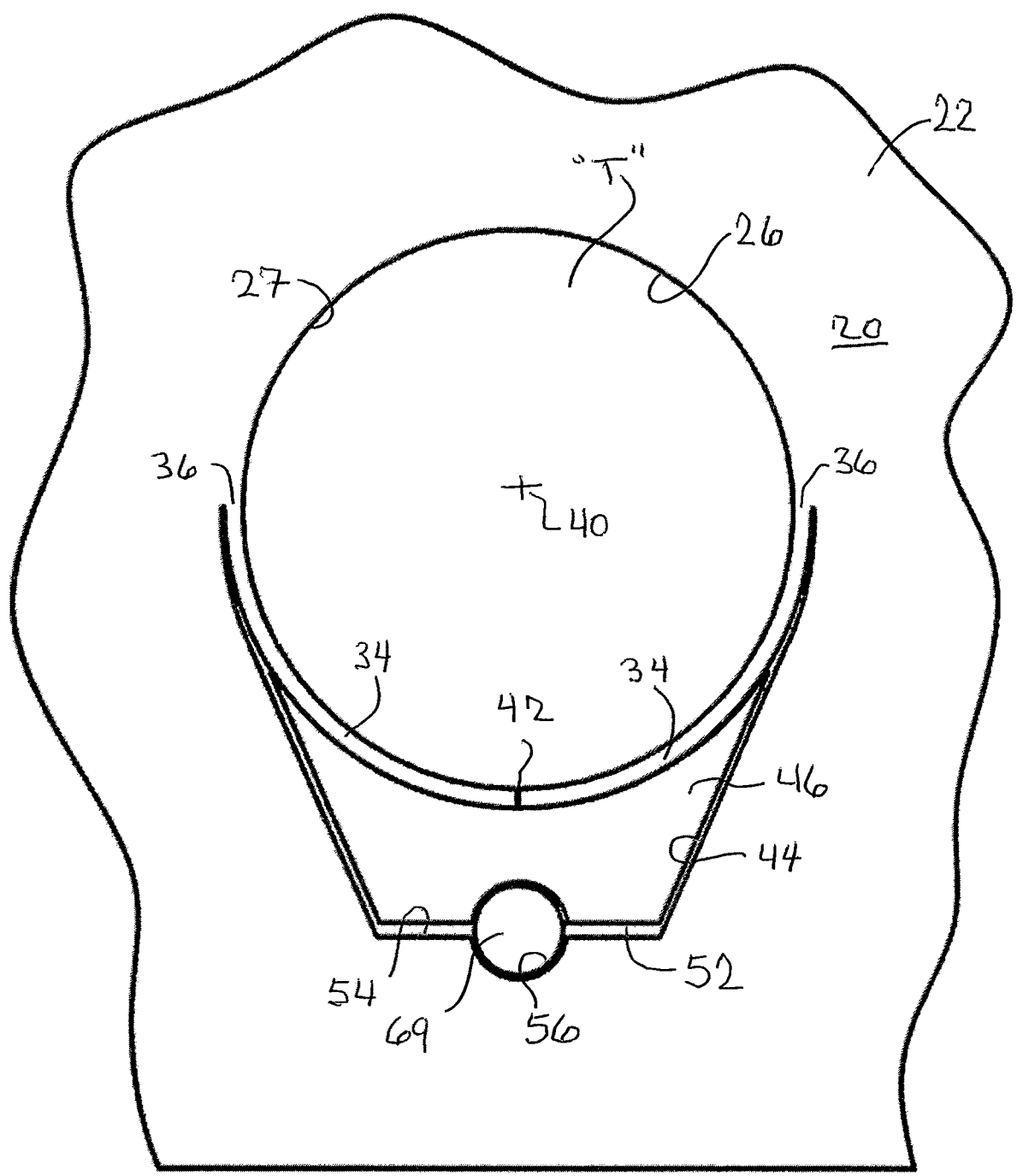
FIG. 2 is a plan view similar to FIG. 1 with the flexible wings shown closed and biased against a tool within the gripper opening bore.
Figure 3:
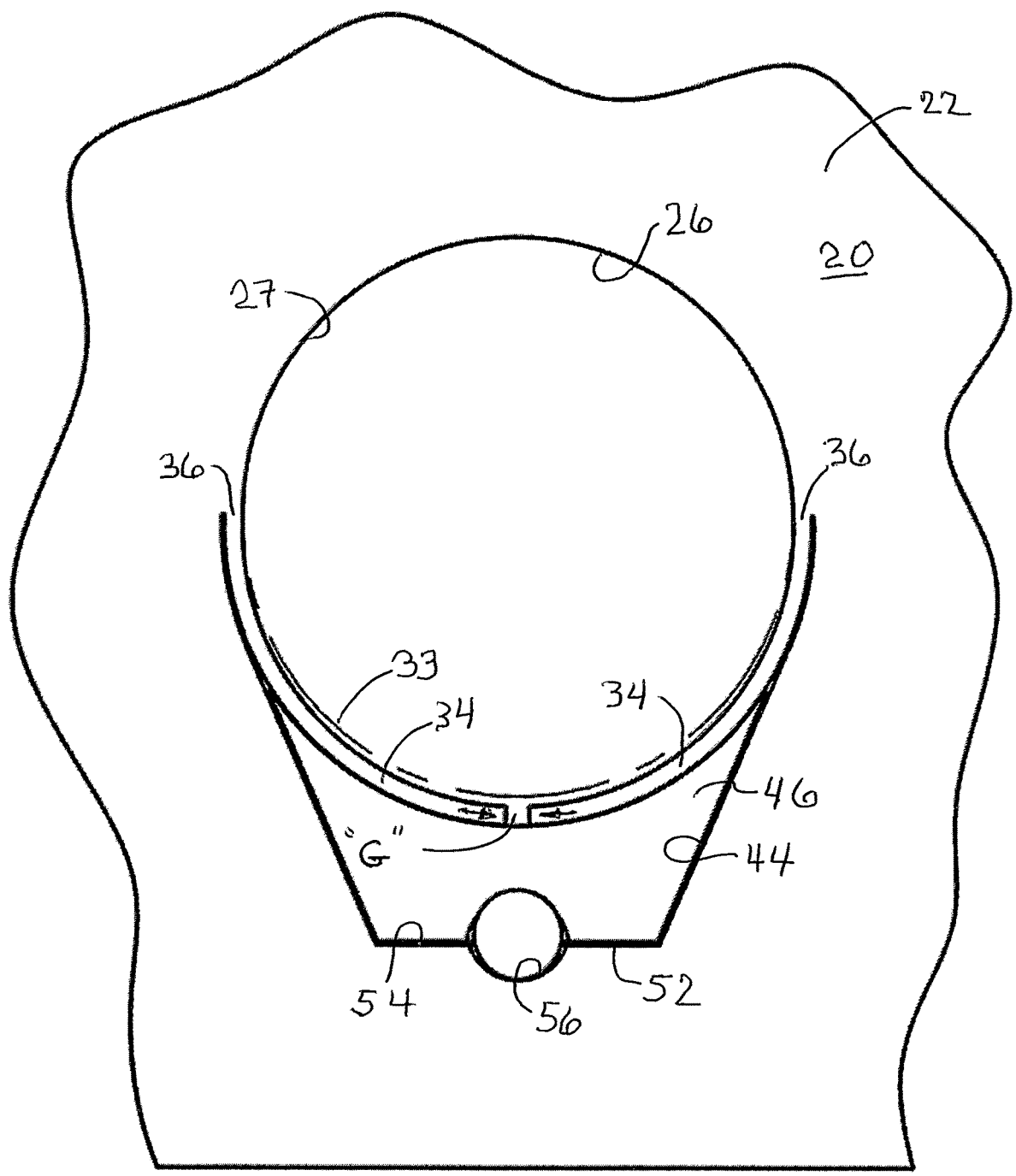
FIG. 3 is a view similar to FIG. 1, without the several axes shown.
Figure 4:
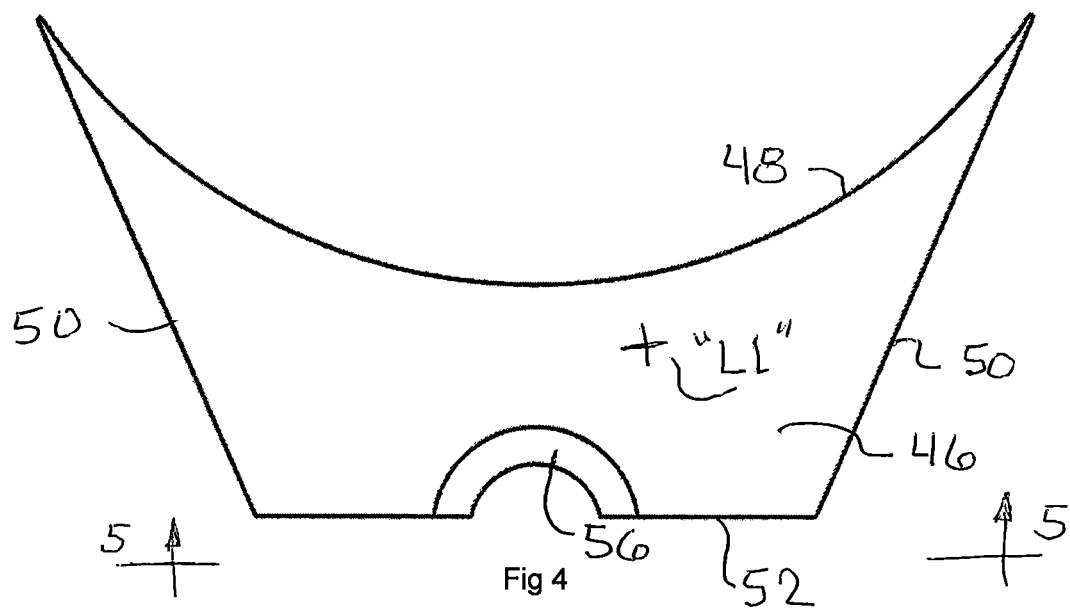
FIG. 4 is an end view of the elongated wedge in its first embodiment.

The first embodiment tool gripper opening arrangement, as shown in FIGS. 1, 2 and 3, comprises a tool gripper opening bore 26 in the holder plate 22, a longitudinal portion of an adjustable bolt bore 56 half formed in that plate 22 (the other half portion is in the truncated wedge 46), a truncated wedge receiving channel 44, which channel 44 has a longitudinal axis L1 which is parallel to the longitudinal axis L2 of the tool gripper opening 26; and an elongated truncated wedge 46, shown in FIGS. 1, 2, 3, 4 and 8, for receipt within the truncated wedge receiving channel 44, best shown in FIGS. 1, 2 and 3.

The tool gripper opening bore 26 is comprised of a semicircular tool engaging periphery 27 (180 degrees) and a generally perfect circle configuration when also comprising the inwardly biased semicircular (180 degrees) flexible wing-tool-engaging portion 33, shown by dashed lines "D" in FIG. 1. This constitutes a move from a very slightly tool-engaging-wings 34 open oval-shape, with a center point 37 when the wing-tool-engaging wings 34 are in their "pre-biased" orientation as shown in FIG. 1. The generally semicircular flexible wing tool engaging portion 33 comprises a pair of thin, quarter-round (each 90 degrees) flexible gripper wings 34 each having a gripper wing flex-point 36 diagonally opposed to one another across the midpoint 40, shown in FIG. 2, of the tool gripper opening 26, with a tool "T" shown therein. The thin flexible gripper wings 34 are best shown in FIGS. 1, 2, 3 and 9, with a closable gap "G" therebetween, each have an elongated distalmost edge 42 which is parallel to the longitudinal axis L2 of the gripper opening bore 26, and abut one another when the wings 34 are biased in their closed orientation shown in FIG. 2. The elongated distalmost edges 42 of the flexible gripper wings 34 are spaced apart from one another in their pre-biased configuration, shown in FIGS. 1, 3 and 9.

The truncated wedge receiving channel 44 is arranged to supportively enclose an elongated truncated wedge 46 having a curvilinear flexible gripper wing biasing surface 48 and two nonparallel side surfaces 50 which each engage the truncated wedge receiving channel 44. The elongated truncated wedge 46 has a truncated flat side 52 which engages a flat inner side 54 of the truncated wedge receiving channel 44, as is shown in FIGS. 1, 2, 3 and 9.

Figure 5:
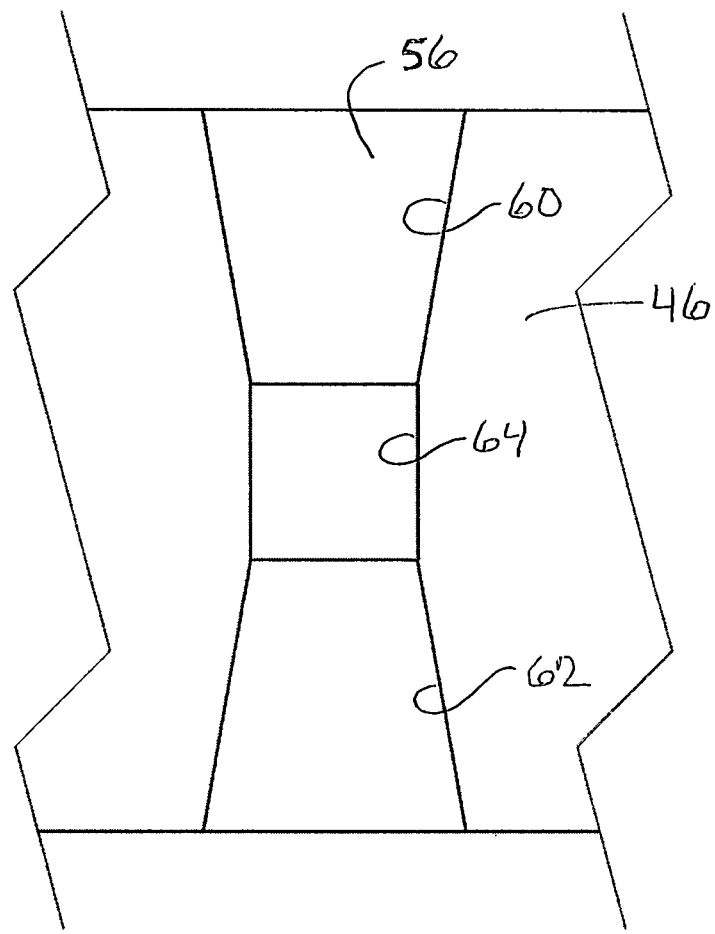
FIG. 5 is a cross-sectional view of an empty elongated adjustment bolt bore for the subsequent receipt of an adjustment bolt for the first embodiment thereof, taken along the lines 5-5 of FIG. 4.
Figure 6:
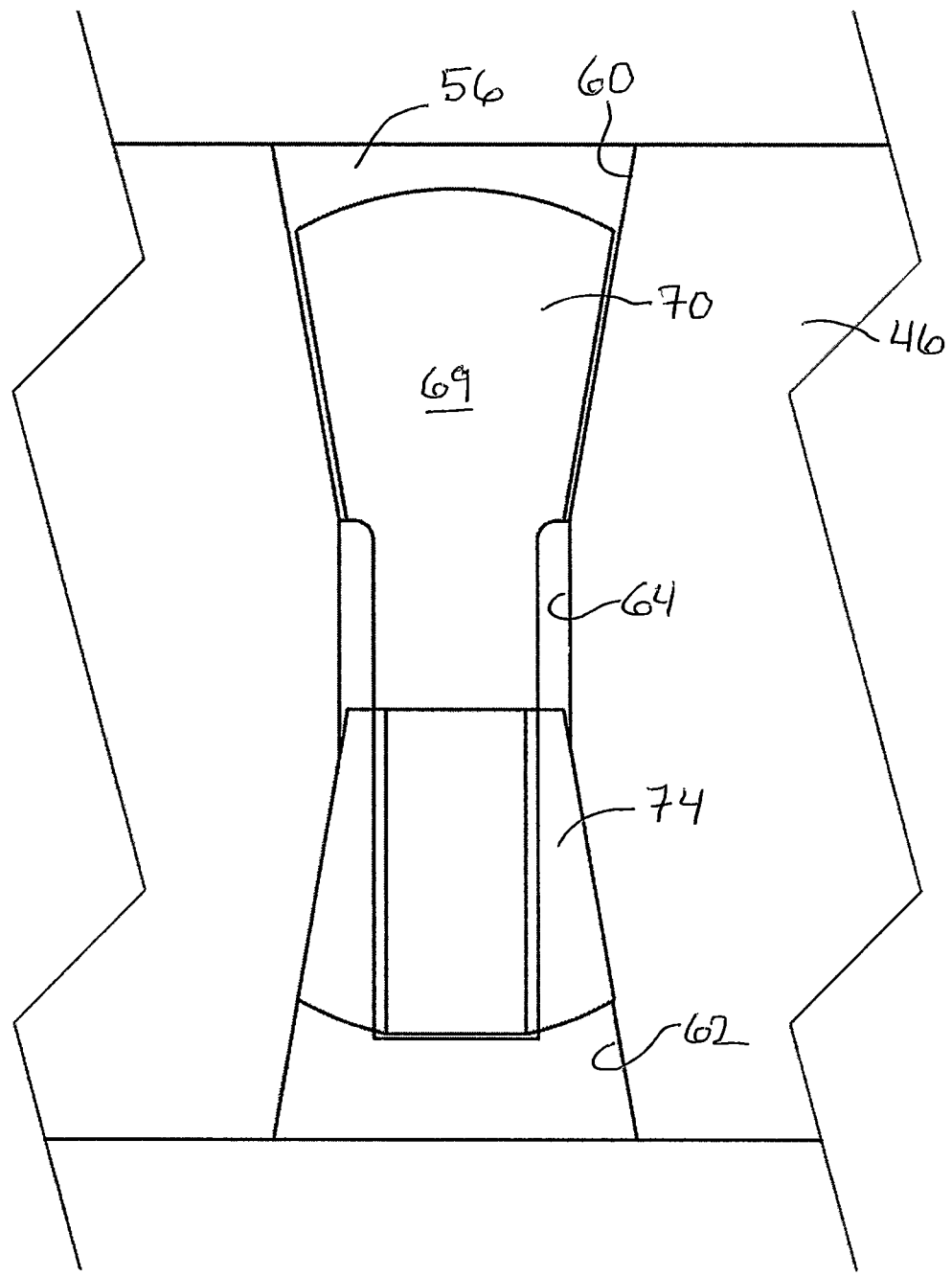
FIG. 6 is a cross-sectional view of the adjustment bolt shown in an adjustment bolt bore half in the plate portion thereof with an cross-section of a tapered nut thereon regarding the adjustment bolt of the first embodiment.
Figure 7:
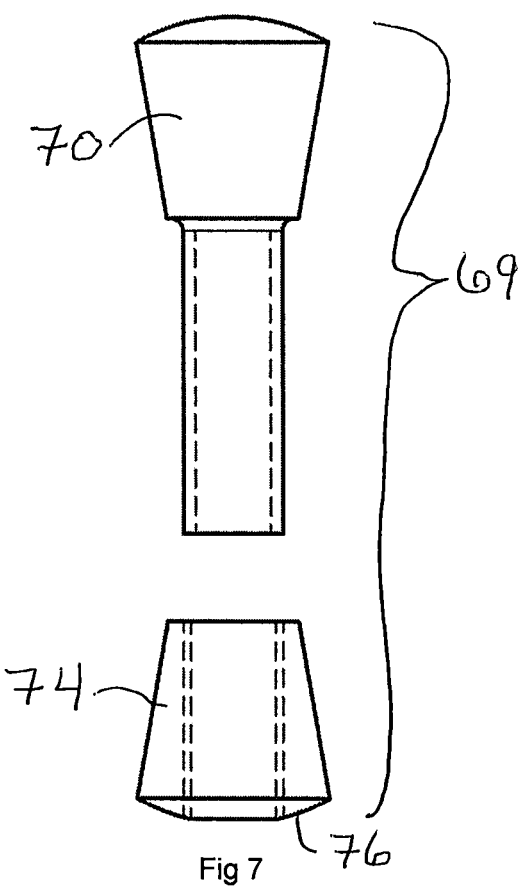
FIG. 7 is an exploded view of a tapered adjustment bolt and a tapered nut.
Figure 8:
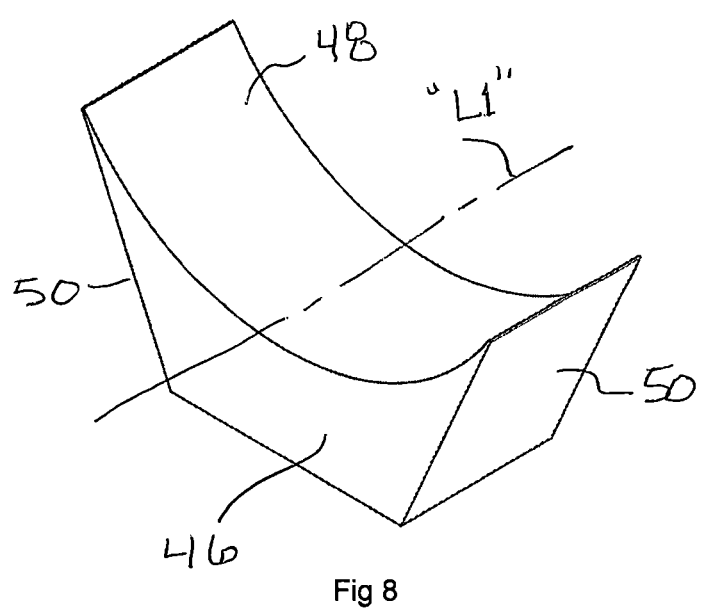
FIG. 8 is a isometric view of the elongated wedge.

A longitudinally split adjustment bolt bore 56, seen in FIGS. 1, 2, 3, 5, 6, and 7, is arranged longitudinally half within the bolt receiving channel or bore 56 within the holder plate 22, and longitudinally half within the elongated truncated wedge 44, the adjustment bolt bore 56 being parallel to the longitudinal axis L2 of the gripper tool holding bore 26 in the holder plate 22 and perpendicular to the longitudinal axis L1 of the elongated truncated wedge 46, (shown in FIG. 8). The longitudinally split adjustment bolt bore 56 has a tapered first end 60, and a tapered second end 62, separated by a pinched cylindrically shaped midwaist portion 64, as shown in FIGS. 5 and 6, extending alignedly through the both the plate 22 and the wedge 46 (wedge 46 is shown).

The adjustment bolt 69, shown in FIGS. 6 and 7, has an upper first or head end 70 of tapered configuration, and a nut 74 arranged on its second lower or distal end 76, the nut 74 being of tapered configuration, best shown in FIGS. 6 and 7, with the tapers arranged to slidably engage the respective tapers on the longitudinally split adjustment bolt bore 56.

When a tool "T" is first arranged within the gripper opening bore 26, the flexible gripper wings 34 are slightly spaced apart from the tool "T" thereadjacent, as may be seen best in FIG. 1. A wedge biasing adjustment bolt 69 within the adjustment bolt bore 56 may be rotatively tightened (by tightening means not shown) so as to bring the tapered head end 70 and the tapered nut 74, shown in FIGS. 6 and 7, thereof closer against the correspondingly tapered ends 60 and 62 of the adjustment bolt bore 56 (half of which is formed onto the bore portion of the truncated wedge 46 abutment, and half on the bore portion on the plate 22) together to biasedly radially inwardly, towards L2 and pressurably engage the intermediately placed wedge 46 between the tightenable adjustment bolt 56 and the pivotable flexible gripper wings 34. Adjustment of the adjustment bolt 69 within the adjustment bolt bore 56 effects the semicircular biasing of the wedge 46, by tightening of the flexible gripper wings 34 against the semicircular portion 33 towards an elongated tool "T" held within the tool gripper opening 26 thereadjacent, thus moving into a perfect circle "D" around that tool "T" being held within the gripper opening bore 26.

Figure 9:
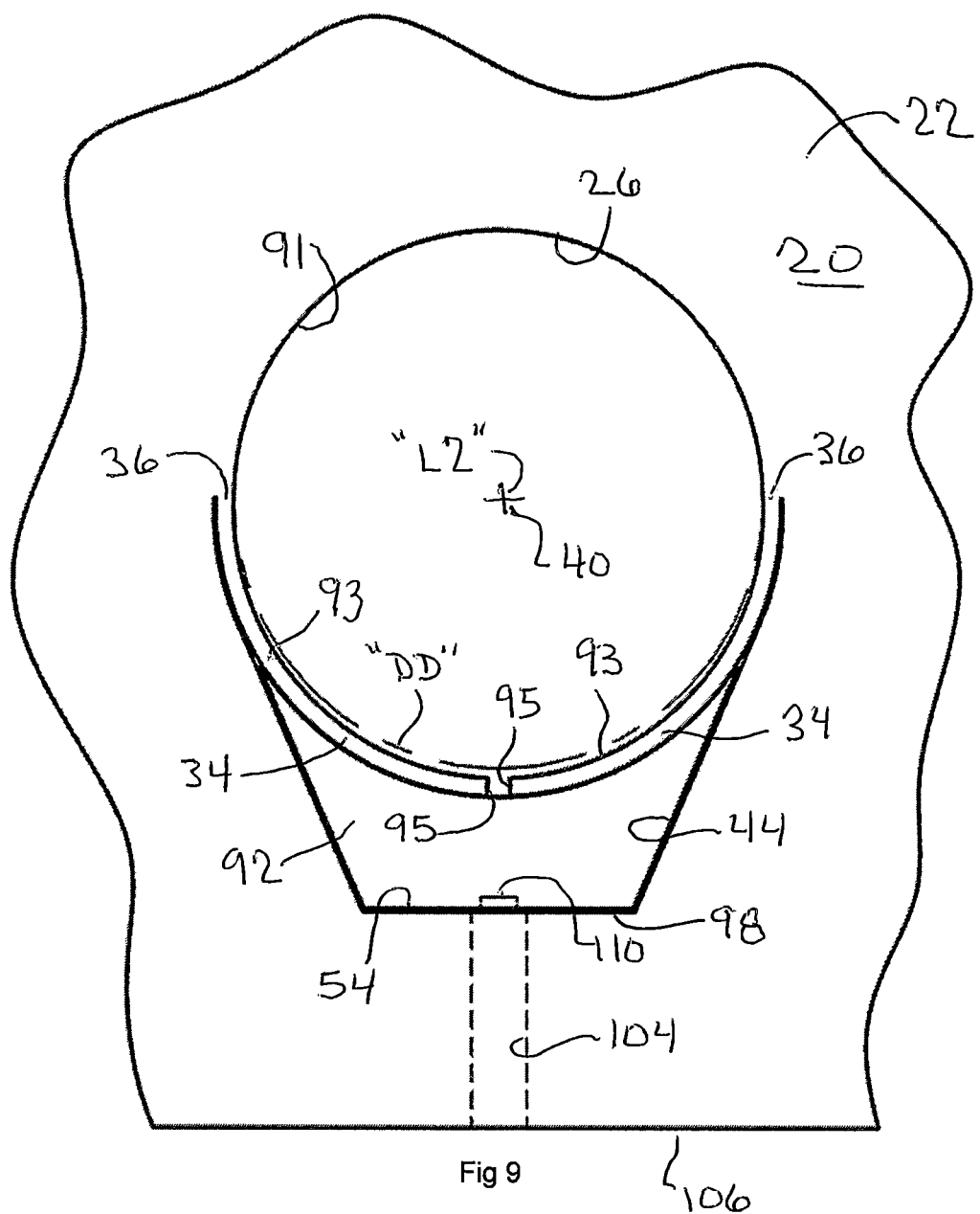
FIG. 9 is a plan view of the flexible gripper holding arrangement arranged adjacent a side of the holder plate with a second embodiment adjustment bolt arrangement arranged therewith.
Figure 10:
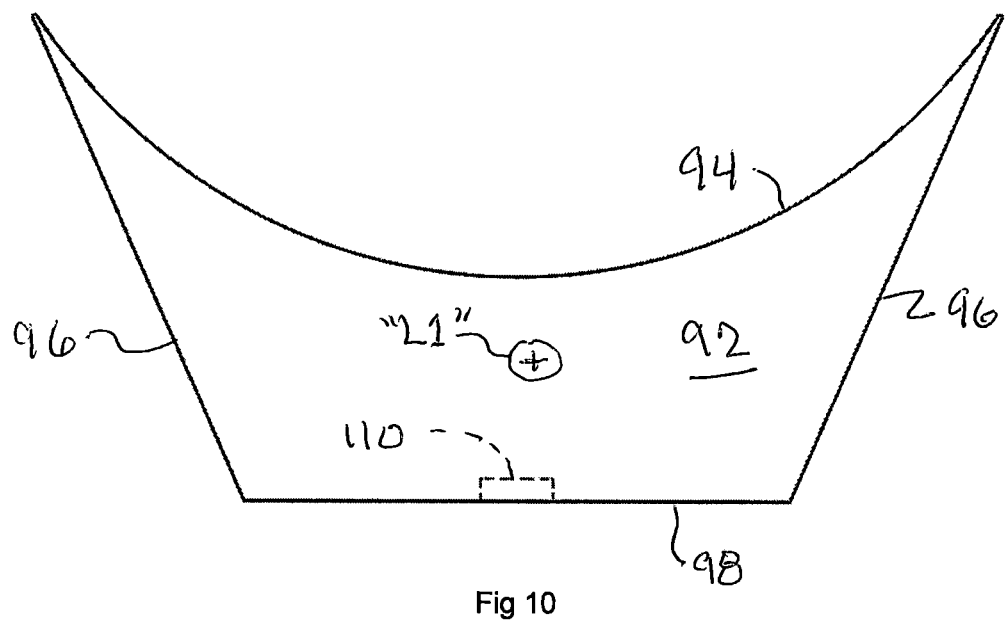
FIG. 10 is an end view of a second embodiment of the wedge utilized with the second embodiment adjustment bolt receiving bore shown therewith.
Figure 11:
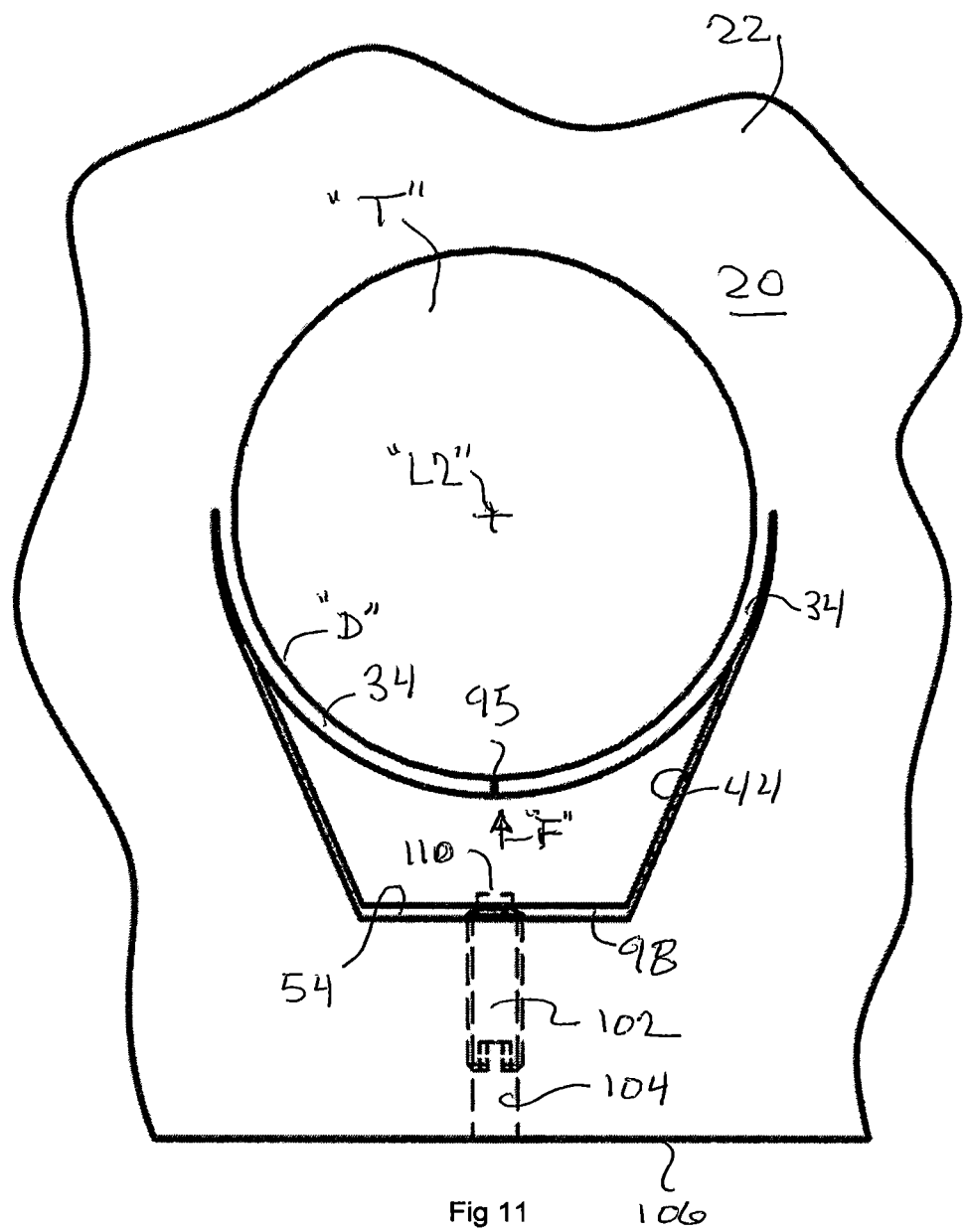
FIG. 11 is a plan view of the second embodiment of the side-of-plate flexible gripper holding arrangement shown with the adjustable pressure bolt pressing against the intermediately disposed wedge which has biased the flexible wings against the semicircular portion of the tool within a tool holder bore in the holder plate.

The second preferred embodiment of the tool gripper opening arrangement 20, best seen in FIGS. 9, 10 and 11, comprises a tool gripper opening 26 in the holder plate 22, positioned relatively close to the side edge 106 of that holder plate 22, as shown in FIGS. 9 and 11. An adjustable bolt bore 104 is shown in plate 22. Also shown in FIGS. 9 and 11 is plate 22, having a truncated wedge receiving channel 44. Wedge 92 has a longitudinal axis "L1" shown in FIG. 10, which axis "L1" is perpendicular to the longitudinal axis "L2" of the tool gripper opening 26. The elongated truncated wedge 92, as shown in FIG. 9, is received within the truncated wedge receiving channel 44.

The second embodiment of the tool gripper securement arrangement shown in FIGS. 9, 10 and 11 is comprised of a semicircular tool engaging wall periphery 91 and a generally semicircular flexible wing-tool-engaging portion 93, the inner positioning of which is shown by dashed line "DD" similar to the first embodiment described hereinabove. The generally semicircular flexible wing tool engaging portion 93 is accomplished by biasing radially inwardly the pair of thin flexible gripper wings 34 each having a gripper wing flex-point 36 diagonally opposed to one another across the midpoint 40 of the tool gripper opening 26. The thin flexible gripper wings 34 each have an elongated distalmost edge 95 which is parallel to the longitudinal axis "L2" of the gripper opening bore 26. The elongated distalmost edges of the flexible gripper wings 34 are spaced apart from one another in their pre-biased configuration, as represented in FIG. 9.

The truncated wedge receiving channel 44 is arranged to supportively enclose an elongated truncated wedge 92, as shown in FIGS. 9 and 11, having a curvilinear flexible gripper wing biasing surface 94 and two nonparallel side surfaces 96 which engage the truncated wedge receiving channel 44, as shown in FIG. 10. The elongated truncated wedge 92 has a truncated side 98 which engages the inner side 54 of the truncated wedge receiving channel 44.

A second embodiment adjustment bolt 102, represented in FIG. 11, is arranged through a second embodiment adjustment bolt receiving bore 104 extending into the side edge 106 of the tool support plate 22 in a manner which is perpendicular to the longitudinal axis L2 of the gripper opening bore 26 and the longitudinal axis L1 of the elongated wedge 92. A shallow adjustment bolt receiving bore 110, as represented in FIG. 11, is arranged within and in longitudinal alignment with the second adjustment bolt receiving bore 104 in the side edge 106 of the tool gripping embodiment of the tool support plate 22. When a threaded second embodiment adjustment bolt 102 is threadably advanced within the bore 102 in the tool support plate 22, a radially inwardly directed biasing force "F" is applied to the elongated wedge 92 which is intermediately disposed between the adjustment bolt 102 and the flexible wings 34 pivotably wrapping around a semicircular portion of a tool "T" within the adjustment bolt receiving bore 26.

Thus, as with both the first and second embodiments of the tool gripper 20, an intermediate member, the elongated wedges (46 and 92) respectively, distributes a radially directed biasing force "F" simultaneously against both flexible wings 34 and hence against a tool "T" within the central bore 26 on plate 22, evenly and without any circumferentially directed biasing against an installed tool "T" as is the case with the prior art.

I claim:

1. A tool gripper assembly arrangement for holding a tool accurately in a holder plate, comprising:
    an elongated gripper bore opening within the holder plate, for receipt of an elongated tool within that gripper bore opening, the elongated gripper bore having a longitudinal axis;
    a pair of thin, flexible, curvilinear gripper wings having a generally semicircular contour extending partially around the gripper bore opening, the pair of gripper wings are bisected by the longitudinal axis and a gap extends between end surfaces of the gripper wings, the gripper wings are arranged between a wedge receiving channel and the gripper bore opening;
    an elongated wedge receiving channel within the holder plate is disposed radially outwardly of the gripper wings which are adjacent the gripper bore opening;
    an elongated gripper-wing-pressing-truncated wedge arranged within the elongated gripper wedge receiving channel;

a side-positioned adjustment bolt receiving bore arranged in a side edge of the holder plate; and an adjustment bolt arranged within the side positioned adjustment bolt receiving bore is configured to bias both the truncated wedge and the pair of gripper wings radially inwardly toward the longitudinal axis of the gripper bore opening and close the gap between the pair of wings to change the contour of the bore to a perfect tool gripping-circle and centrically locate the tool within the elongated gripper bore.

2. The tool gripper assembly as recited in claim 1, wherein the elongated gripper-wing-pressing truncated wedge has an adjustment bolt receiving-recess in longitudinal alignment with the side positioned adjustment bolt receiving bore to enable properly radially inwardly directed bias to the gripper wing pressing wedge by the adjustment bolt thereagainst.

3. The tool gripper assembly as recited in claim 2, wherein the adjustment bolt has a longitudinal axis which is perpendicular to the longitudinal axis of the gripper bore opening.

4. The tool gripper assembly as recited in claim 1 wherein the flexible curvilinear gripper wings pivot slightly about the ends proximal to the gap in opposite-directions when biased radially inwardly by the gripper wing pressing wedge, thereby avoiding any rotational bias against a tool within the elongated gripper bore opening.

\* \* \* \* \*